United States Patent
Mendes et al.

(10) Patent No.: US 12,411,943 B1
(45) Date of Patent: Sep. 9, 2025

(54) DATA BREACH EARLY WARNING NOTIFICATION

(71) Applicant: PrivacyHawk, Inc, Los Angeles, CA (US)

(72) Inventors: Aaron Mendes, San Diego, CA (US); Justin Wright, Los Angeles, CA (US)

(73) Assignee: PrivacyHawk, Inc., Los Angeles, CA (US)

( * ) Notice: Subject to any disclaimer, the term of this patent is extended or adjusted under 35 U.S.C. 154(b) by 0 days.

(21) Appl. No.: 18/884,742

(22) Filed: Sep. 13, 2024

(51) Int. Cl.
| | |
|---|---|
| *G06F 21/50* | (2013.01) |
| *G06F 16/2457* | (2019.01) |
| *G06F 16/25* | (2019.01) |
| *G06F 21/55* | (2013.01) |
| *H04L 51/212* | (2022.01) |

(52) U.S. Cl.
CPC ...... *G06F 21/552* (2013.01); *G06F 16/24575* (2019.01); *G06F 16/256* (2019.01); *H04L 51/212* (2022.05)

(58) Field of Classification Search
CPC ............ G06F 16/24575; G06F 16/256; G06F 21/552; H04L 51/212
See application file for complete search history.

(56) References Cited

U.S. PATENT DOCUMENTS

| | | | | |
|---|---|---|---|---|
| 9,077,747 | B1* | 7/2015 | Chen | H04L 63/1433 |
| 11,750,625 | B1* | 9/2023 | Sharma | H04L 63/10 |
| | | | | 705/42 |
| 2019/0362069 | A1 | 11/2019 | Park et al. | |
| 2020/0233971 | A1* | 7/2020 | Sharp-Paul | G06F 21/604 |
| 2020/0304544 | A1* | 9/2020 | Vasanthapuram | ............ |
| | | | | H04L 63/1416 |
| 2021/0334355 | A1* | 10/2021 | Edwards | G06F 21/6218 |
| 2022/0191233 | A1* | 6/2022 | Kras | G06F 21/6245 |

FOREIGN PATENT DOCUMENTS

WO    2022125496 A1    6/2022

* cited by examiner

*Primary Examiner* — Diedra McQuitery
(74) *Attorney, Agent, or Firm* — Muncy, Geissler, Olds & Lowe, P.C.

(57) ABSTRACT

Disclosed are techniques for providing an early warning notification to a user if the user was likely involved in a data breach. In an aspect, an apparatus scans an email account of a user of a user device to identify a set of service providers from which the email account of the user has received one or more emails, searches one or more data breach reporting databases for at least a subset of the set of service providers, and provides an indication to the user of whether personal information of the user is likely to have been exposed in a data breach, wherein the personal information of the user is likely to have been exposed in the data breach based on at least one service provider of the set of service providers being present in at least one of the one or more data breach reporting databases.

18 Claims, 6 Drawing Sheets

DATA BREACH EARLY WARNING NOTIFICATION

TECHNICAL FIELD

Aspects of the disclosure relate generally to increasing the privacy of a user's personal information, and more specifically, to providing an early warning notification to a user if the user's personal information was likely exposed in a data breach.

BACKGROUND

With the ever-increasing use of the Internet to interact with different service providers (e.g., retailers, utility companies, financial institutions, social media applications, organizations, government entities, etc.), users are creating more and more online accounts. Each of these accounts generally requires the user to provide a significant amount of personal information, such as name, address, email, phone number, credit card information, password, birthdate, etc. This account information is generally stored in a database controlled by the service provider, along with the account information for thousands, or even millions, of other users.

Unfortunately, the user information stored in such a database may become exposed due to a data breach. A data breach is any unauthorized exposure, disclosure, or loss of personal information and can be the result of accidental or intentional disclosure of the information by insiders, loss or theft of unencrypted devices, hacking into a system by exploiting software vulnerabilities, social engineering attacks (e.g., phishing, where insiders are tricked into disclosing sensitive information, such as login information), and/or the like.

Once this personal information is exposed by a data breach, it becomes an attractive target to criminals. Many criminals sell personal information obtained in data breaches on the Dark Web (Internet content that requires specific software, configurations, and/or authorization to access). These criminals have a variety of motives, such as financial gain, political activism, political repression, espionage, etc. Users whose personal information has been compromised are at an increased risk of identity theft for up to years afterwards, and a significant number become victims of that crime.

Many jurisdictions, including all states of the United States and all member states of the European Union, have enacted data breach notification laws that require the notification of users whose personal information has been breached. However, there may be a delay between the breach, the time the service provider identifies the users whose personal information may have been breached, and the time the service provider notifies the affected users. As such, users may not know until much later that their personal information has been compromised.

Because of the harm that can befall a user when their personal information is exposed on the Dark Web, such as identity theft, identity theft monitoring services are becoming increasingly popular. However, identity theft services do not know all the service providers with which a user may have an account, and most data breach announcements do not include the names or emails of the affected users. As such, an identity theft service can only monitor the Dark Web and inform a user if the service finds that user's personal information. Unfortunately, by the time the user's personal information has been discovered on the Dark Web, that information has very likely already been sold to hackers, scammers, and other such criminals.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method performed by an apparatus includes scanning an email account of a user of a user device to identify a set of service providers from which the email account of the user has received one or more emails; searching one or more data breach reporting databases for at least a subset of the set of service providers; and providing an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

In an aspect, an apparatus includes one or more memories; one or more transceivers; and one or more processors communicatively coupled to the one or more memories and the one or more transceivers, the one or more processors, either alone or in combination, configured to: scan an email account of a user of a user device to identify a set of service providers from which the email account of the user has received one or more emails; search one or more data breach reporting databases for at least a subset of the set of service providers; and provide an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

In an aspect, an apparatus includes means for scanning an email account of a user of a user device to identify a set of service providers from which the email account of the user has received one or more emails; means for searching one or more data breach reporting databases for at least a subset of the set of service providers; and means for providing an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

In an aspect, a non-transitory computer-readable medium stores computer-executable instructions that, when executed by an apparatus, cause the apparatus to: scan an email account of a user of a user device to identify a set of service providers from which the email account of the user has received one or more emails; search one or more data breach reporting databases for at least a subset of the set of service providers; and provide an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

The present disclosure provides techniques to use an email scan of a user's inbox to identify service providers with which a user is likely to have an account in order to provide an early warning notification to the user if they were likely involved in a data breach. In some cases, the email scan may be part of an opt-out procedure in which the user's email account is scanned for emails from service providers for which the user would like to exercise a privacy right (e.g., opt-out of marketing emails). Once the service providers with which the user is likely to have an account are identified, the disclosed system searches public and private databases of data breach reports for the identified service providers. If a service provider with which the user is likely to have an account is found in such a database, the user can be immediately notified.

By comparing the service providers with which a user is likely to have an account with the databases of data breach reports, the user can be informed that their personal information may have been exposed by a data breach long before that information is posted on the Dark Web, and even before the user is otherwise notified by the service provider of the breach. This allows the user to take mitigating action (e.g., changing login passwords, canceling credit cards, adding two-factor authentication (2FA), etc.) before their personal information is published on the Dark Web, thereby enabling the user to avoid identity theft.

The email opt-out procedure, including the email scan that the data breach early notification system may utilize, will be described with reference to FIGS. 1 and 2. Specifically, FIG. 1 illustrates an example system 100 for implementing the email opt-out and data breach early notification procedures described herein, and FIG. 2 illustrates a signaling flow 200 for an example email opt-out procedure, according to aspects of the disclosure.

Figure 1:
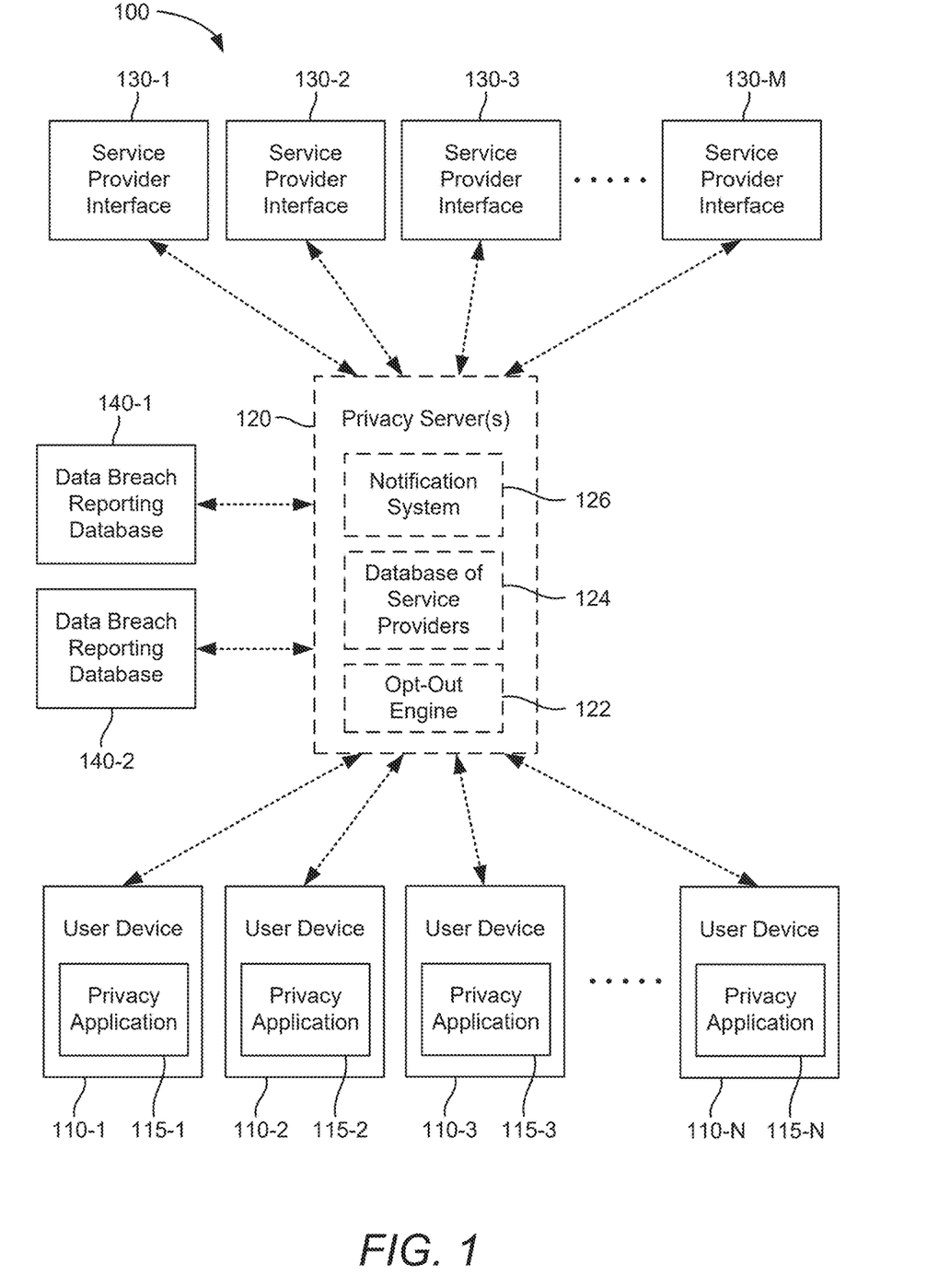
FIG. 1 illustrates an example system for implementing the email opt-out and early data breach notification procedures described herein.
Figure 2:
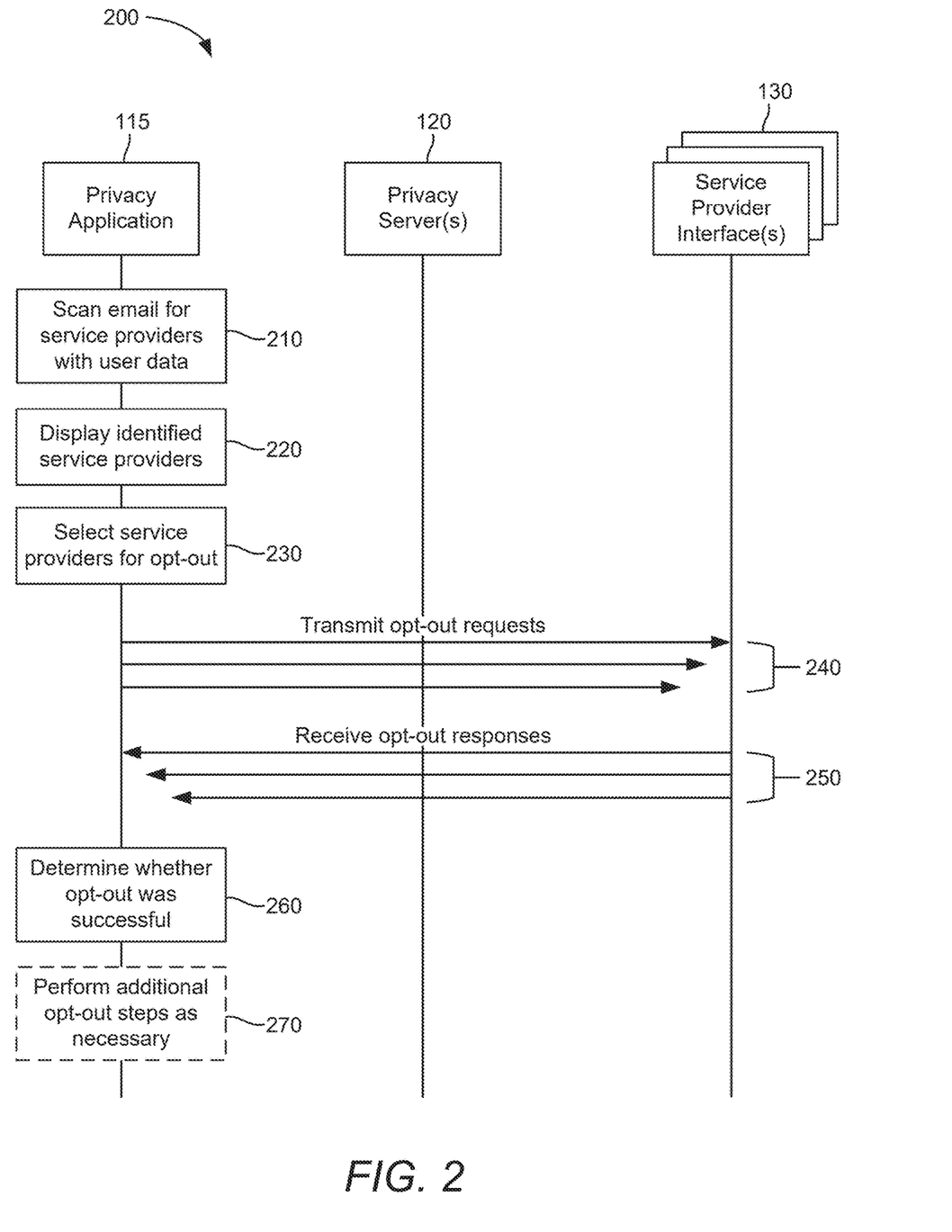
FIG. 2 illustrates a signaling flow for an example email opt-out procedure, according to aspects of the disclosure.

As shown in FIG. 1, a plurality of N user devices 110 (illustrated as user devices 110-1, 110-2, 110-3, . . . 110-N) each have a privacy application 115 installed thereon (illustrated as privacy applications 115-1, 115-2, 115-3, . . . 115-N). A user device 110 may be a smartphone, a tablet computer, a laptop computer, a desktop computer, or the like. The N user devices 110 may optionally be in communication with a privacy server 120 (or a group of distributed privacy servers 120). The privacy server(s) 120 implement an opt-out engine 122 and store a database of service providers 124 (e.g., all known service providers, all service providers from which users have been known to opt-out, all service providers of given type(s), or the like). The privacy server 120 is in communication with a plurality of M service providers (e.g., retailers, utility companies, financial institutions, social media applications, organizations, government entities, etc.) that may store users' personal information (also referred to as "first party data"). More specifically, a communication interface of the privacy server 120 may connect to communication interfaces of the service providers 130 over a wired and/or wireless network, such as the Internet, via websites, webservers, and/or the like associated with the service providers 130.

In some cases, rather than the privacy application 115 running locally on the user device 110, the privacy application 115 may run remotely on the privacy server(s) 120 (not shown in FIG. 1). In this case, the user may access the privacy application 115 via a website hosted by the privacy server(s) 120.

Many of the service providers with which a user is likely to have an account, and thus may have the user's first party data, are likely to be found in the user's email. The user account may be any account where the user's information is stored digitally in a database that could be breached. Such accounts are not limited to online accounts where the user accesses a service provider's services via an online portal. For example, the user may have an account with a brick-and-mortar retail store where the retail store sends emails to the user and may store the user's purchase data from in-store transactions. Such a retail establishment may not have an online portal for the user to access their account.

Thus, at stage 210 of FIG. 2, a privacy application 115 (optionally in communication with the opt-out engine 122) installed on a user device 110 scans the user's email for service providers that are likely to have the user's first party data. In some cases, this may be all the commercial/governmental/educational email accounts/domains from which the user has ever received email. In some cases, this may be all the sender email accounts/domains that match a service provider in the database of service providers 124. In this case, the privacy application 115 may securely provide a list of all commercial/governmental/educational email accounts/domains found in the user's email to the opt-out engine 122, which may in turn compare that list to the database of service providers 124. The opt-out engine 122 may then return to the privacy application 115 a list of service providers in the database of service providers 124 that match the list of service providers email accounts/domains received from the privacy application 115.

Based on the user's privacy preferences with respect to the user device 110 and/or email application, the user may need to grant the privacy application 115 permission to access the user's email application. In some cases, the user's email (or at least a portion of the user's email) may not be stored locally on the user device 110, but rather, on one or more remote email servers (not shown in FIG. 1 or 2). In those cases, the privacy application 115 may securely connect with the remote email server(s) to access the user's email (e.g., via communication interfaces of the user device 110 and the remote email server(s)).

Once the user's email has been scanned, at stage 220, the privacy application 115 displays a list of the identified service providers to the user via the user interface of the user device 110. The privacy application 115 may display a select button by each entry in the list of service providers identified at stage 210 to allow the user to select the corresponding service provider. The privacy application 115 may also recommend which service providers to select. For example, the privacy application 115 may display a list of "Recommended" service providers or highlight recommended service providers within the list of identified service providers. The recommendations may be based on information from the privacy server(s) 120.

At stage 230, the privacy application 115 selects the service providers to which to send opt-out requests. The selection may be based on user input. For example, the user may select to opt-out of all identified service providers, only recommended service providers, only service providers of a certain type (e.g., retailers, political organizations, etc.), or the like. The user may further indicate the type of opt-out desired (i.e., the type of privacy right the user wishes to exercise), such as having all their first party data deleted, opting out of having their first party data shared with affiliates or other third parties, unsubscribing from promotional/marketing emails (often referred to as "spam"), requesting a copy of the data that the entity holds about the user ("right to know request"), or the like. Alternatively, the selection and type of opt-out may be selected automatically. For example, when initiating the email scan at stage 210, the user may set a preference to opt-out from allowing any service provider to share the user's personal information.

At stage 240, the privacy application 115 transmits opt-out requests to the selected service providers (optionally via the privacy server 120/opt-out engine 122). Some service providers handle opt-out requests by email (i.e., a user is expected to compose and send an opt-out request to the service provider by email) and other service providers handle opt-out requests by webform (i.e., the user is expected to fill out an online form requesting the opt-out). An opt-out request is generally more effective if it comes directly from the user. Accordingly, for email-based opt-out requests, the privacy application 115 composes and sends emails requesting the types of opt-outs for the respective service providers from the user's email account. For webform-based opt-outs, the privacy application 115 fills out and submits the applicable webform using any user data required by the webform (e.g., name, address, email, etc.).

At stage 250, the privacy application 115 receives responses to the opt-out requests sent at stage 240 (optionally via the privacy server 120/opt-out engine 122). The responses may be received immediately on submission of the opt-out request (which may occur in the case of a webform request) or at some later time (e.g., after the service provider has manually processed the opt-out request email or webform). The responses may indicate that the opt-out was successful (e.g., the service provider deleted and/or will not share/sell the user's personal information), that additional information or steps are necessary, that the user's data was not found (and therefore cannot be deleted), etc. If the opt-out response is not received immediately, the response will likely be received as an email at some later time.

At stage 260, based on the responses from the service providers received at stage 250, the privacy application 115 determines whether the respective opt-out requests were successful or if more information/steps are needed. In the case of a successful opt-out, the privacy application 115 may add that service provider to a list of successful opt-outs that may be displayed to the user on the user interface of the user device 110.

In the case that more information/steps are necessary to complete the opt-out, at stage 270, the privacy application 115 may determine what the information/steps are and perform them if possible. If not, the privacy application 115 notifies the user that there is additional information or additional steps needed to complete the opt-out. The user may then perform those steps or provide that information manually.

Note that a user may have multiple email accounts. As such, the procedure illustrated in FIG. 2 may be repeated for as many different email accounts the user wishes to process.

As will be appreciated, while FIGS. 1 and 2 illustrate one or more privacy servers 120, as will be appreciated, the techniques described herein may be performed entirely by the privacy application 115 locally on the user device 110. For example, the privacy application 115 may display all service providers identified within the user's email at stage 220, rather than comparing those service providers to the database of service providers 124 stored at the privacy server 120 at stage 210. Or the database of service providers 124 may be stored locally on the user device 110.

Alternatively, the privacy application 115 may simply be a communication gateway between the user device 110 (specifically the user's email application) and the opt-out engine 122, and the opt-out engine 122 may perform the substantive operations illustrated in FIG. 2. For example, at stage 210, the privacy application 115 may scan the user device 110 for any locally stored emails and send a list of identified service provider domains to the opt-out engine 122. The opt-out engine 122 may scan the user's emails stored on one or more remote email servers and compile a list of identified service providers based on the list received from the privacy application 115 (if any) and its own scan. At stage 220, the opt-out engine 122 may provide the list of identified service providers to the privacy application 115, which may then display the list on the user interface of the user device 110.

Similarly, at stage 230, the privacy application 115 may provide the user selections to the opt-out engine 122, which may then send the opt-out requests to the service providers at stage 240 and receive the responses at stage 250. The opt-out engine 122 may further perform stages 260 and 270.

As yet another alternative, the privacy application 115 may not be necessary at all, and the user may access the opt-out engine 122 via an Internet browser rather than the privacy application 115. In this case, the opt-out engine 122 would perform the operations illustrated in FIG. 2 and interact with the user of the user device 110 as needed (e.g., at stages 220 and 230) via the Internet browser (e.g., an online webform).

Figure 3:
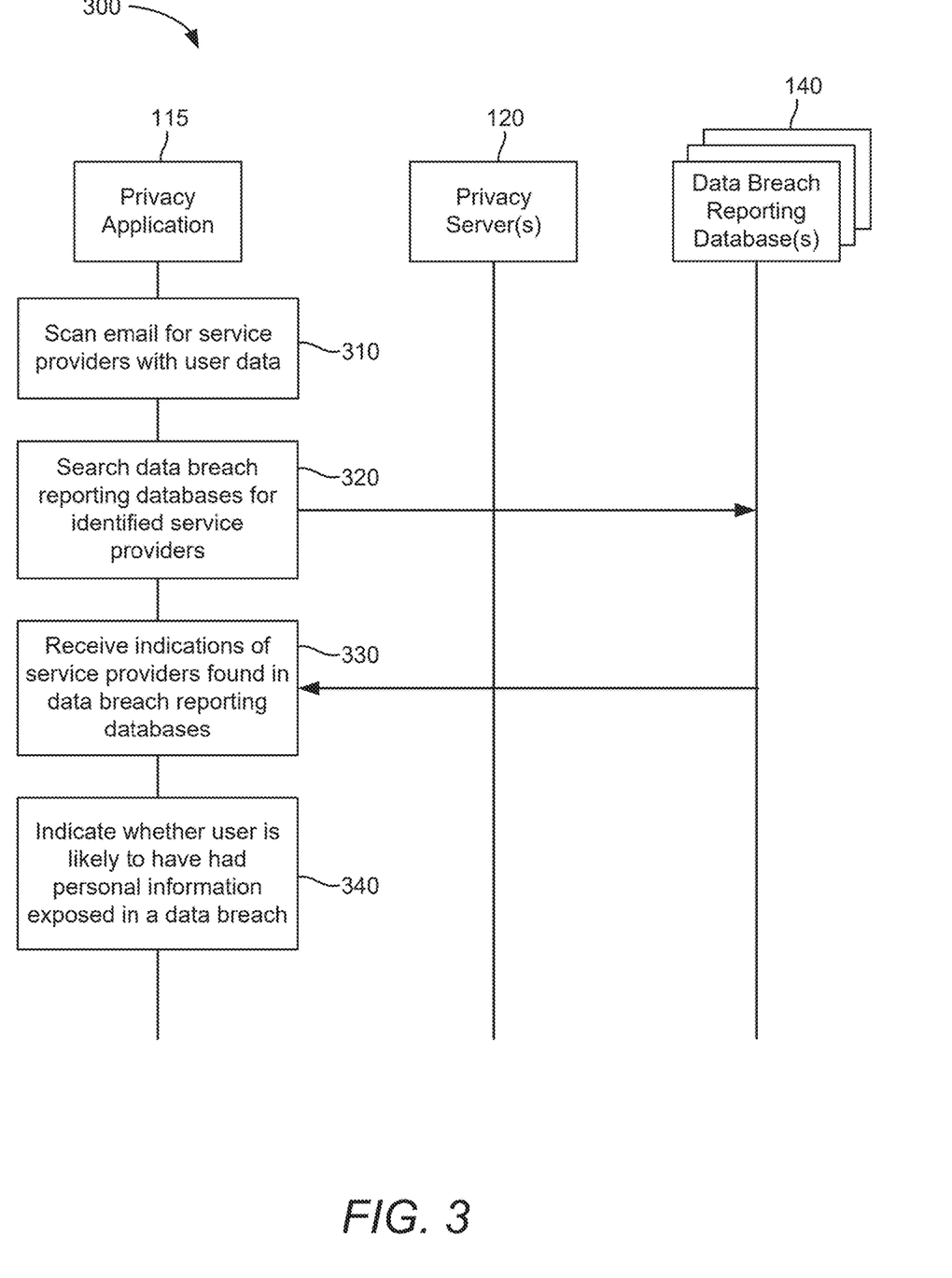
FIG. 3 illustrates a signaling flow for an example data breach early notification procedure, according to aspects of the disclosure.

The data breach early notification system is now described with reference to FIGS. 1 and 3. As noted above, the example system 100 in FIG. 1 illustrates components for implementing the data breach early notification procedures described herein. FIG. 3 illustrates a signaling flow 300 for an example data breach early notification procedure, according to aspects of the disclosure.

As shown in FIG. 1, the privacy server(s) 120 may be coupled to one or more data breach reporting databases 140 (illustrated as two data breach reporting databases 140-1 and 140-2). The data breach reporting database(s) 140 may be public (freely available to everyone) or private/proprietary (only available to subscribers) and store a list of service providers who have experienced a data breach. The data breach reporting database(s) 140 may store any known details of the data breaches, such as the date of the breach, types of users affected (users subscribed to a particular service), types of information exposed (e.g., names and social security numbers but not credit card information), the service provider announcement of the breach, and/or the like.

In some cases, the data breach reporting database(s) 140 may be hosted by separate entities from the privacy server(s) 120, such as government entities, third-party watchdogs, identity theft monitoring companies, and/or the like. However, in some cases, the data breach reporting database(s) 140 may be stored at or components of the privacy server(s) 120 (in which case they may be private databases).

At stage 310 of FIG. 3, the privacy application 115 installed on a user device 110 scans the user's email account for service providers with which the user of the user device 110 is likely to have an account. This email scan may be the same as the scan at stage 210 of FIG. 2. In some cases, the service providers with which the user is likely to have an account may be all the commercial, governmental, educational, etc. email accounts/domains from which the user has ever received email. In some cases, the service providers with which the user is likely to have an account may be all the sender email accounts/domains that match a service provider in the database of service providers 124.

In this case, the privacy application 115 may securely provide a list of all commercial, governmental, educational, etc. email accounts/domains found in the user's email to the privacy server(s) 120, which may in turn compare that list to the database of service providers 124. The privacy server(s) 120 may then return to the privacy application 115 a list of service providers in the database of service providers 124 that match the list of service provider email accounts/domains received from the privacy application 115.

Based on the user's privacy preferences with respect to the user device 110 and/or email application(s), the user may need to grant the privacy application 115 permission to access the user's email application(s). In some cases, the user's email (or at least a portion of the user's email) may not be stored locally on the user device 110, but rather, on one or more remote email servers (not shown in FIG. 1). In those cases, the privacy application 115 may securely connect (establish a secure connection) with the remote email server(s) to access the user's email (e.g., via communication interfaces of the user device 110 and the remote email server(s)).

Once the user's email account has been scanned, at stage 320, the privacy application 115 searches the data breach reporting database(s) 140 for the service providers identified at stage 310. In some cases, the privacy application 115 may directly query the data breach reporting database(s) 140 (e.g., via communication interfaces of the user device 110 and the data breach reporting databases(s) 140). In some cases, the privacy application 115 may provide the list of service providers identified at stage 310 to the privacy server(s) 120 (e.g., the notification system 126), which may in turn search the data breach reporting database(s) 140 for the identified service providers (whether the data breach reporting database(s) 140 are local to the privacy server(s) 120 or managed by third-party entities). In either case, searching the data breach reporting database(s) 140 may include populating a search interface associated with the data breach reporting database(s) 140 with the list of identified service providers or with each service provider on the list one at a time.

At stage 330, the search interface(s) associated with the data breach reporting database(s) 140 return an indication of whether and/or which of the queried service providers are present in the data breach reporting database(s) 140. In some cases, the search results may be a list of indications of whether the queried service providers were "found" or "not found." In some cases, the search results may be a list of the subset of queried service providers that were found in the data breach reporting database(s) 140. For service providers that were found in the data breach reporting database(s) 140, the search interface(s) associated with the data breach reporting database(s) 140 may also return any available information about the associated data breach(es), such as the date of the breach, types of users affected (users subscribed to a particular service), types of information exposed (e.g., names and addresses but not credit card information or social security numbers), and/or the like.

In some cases, the privacy application 115 may directly receive the search results from the data breach reporting database(s) 140 (e.g., via communication interfaces of the user device 110 and the remote email server(s)). In some cases, the privacy application 115 may receive the search results from the data breach reporting database(s) 140 via the privacy server(s) 120 (e.g., the notification system 126).

At stage 340, the privacy application 115 provides an indication to the user of whether they are likely to have had their personal information compromised based on whether their email account contains emails from one or more service providers that experienced a data breach, as determined at stages 320 and 330. The indication may be displayed in the privacy application 115, emailed to the user, texted to the user, or otherwise provided to the user. The indication may be, for example, a notification such as "Your personal information may have been exposed in a data breach," or "Your personal information is not likely to have been exposed in a known data breach."

In some cases, the privacy application 115 may display a list of the service providers found in the user's email account that experienced a data breach. The user can then determiner whether they do indeed have an account with any of those service providers, and if so, take mitigating action (e.g., changing login passwords, canceling credit cards, adding 2FA, etc.) before their personal information is published on the Dark Web, thereby avoiding identity theft.

In some cases, the privacy application 115 may also provide any information available about the breach (which may have been received with the search results at stage 330). As noted above, that information may include the date of the breach (or breaches, as some service providers may have been victims of multiple data breaches), types of users affected (users subscribed to a particular service), types of information exposed (e.g., names and email addresses but not social security numbers), and/or the like.

In some cases, where the user initiated the email scan at stage 310, the privacy application 115 may display, via the user interface of the user device 110, the list of service providers with which the user likely has an account that were found in the email scan at stage 310. In that way, the user can determine/confirm whether they do indeed have an account with those service providers, and the data breach reporting database(s) 140 are only queried at stage 320 for service providers with which the user is confirmed to have an account.

More specifically, after stage 310, the privacy application 115 may display a list of the identified service providers to the user via the user interface of the user device 110. The privacy application 115 may display a selection box (e.g., a check box or radio button) by each entry in the list of service providers identified at stage 310 to allow the user to select the corresponding service provider. The selection may indicate that the user has an account with that service provider. In that way, the list of service providers compared to the data breach reporting database(s) 140 would only include service providers with which the user actually has an account, rather than all service providers with which the user is likely to have an account. Likewise, the list of service providers output at stage 340 would be only the service providers found in the data breach reporting database(s) 140 with which the user actually has an account that were, rather than all service providers found in the data breach reporting database(s) 140 with which the user is likely to have an account.

In some cases, the procedure illustrated in FIG. 3 may be performed periodically (e.g., every day, every week, every month) without the user explicitly triggering the procedure. In that case, the list of service providers with which the user likely has an account that were found in the data breach reporting database(s) 140 may be emailed to the user's email account, texted to the user, stored in the privacy application 115 for future display to the user, and/or the like.

In some cases, where the procedure illustrated in FIG. 3 is performed periodically, the results of the subsequent searches of the data breach reporting database(s) 140 provided to the user at stage 340 may only include service providers that were not previously provided at stage 340. That is, once a service provider is indicated to have been involved in a data breach at stage 340, it is not listed again at stage 340 for subsequent iterations of the procedure illustrated in FIG. 3, unless that service provider is involved in a new data breach.

Some users have multiple email accounts. As such, the signaling flow 300 may be repeated for each email account of the user that may be associated with an online account of the user, as desired by the user.

Figure 4:
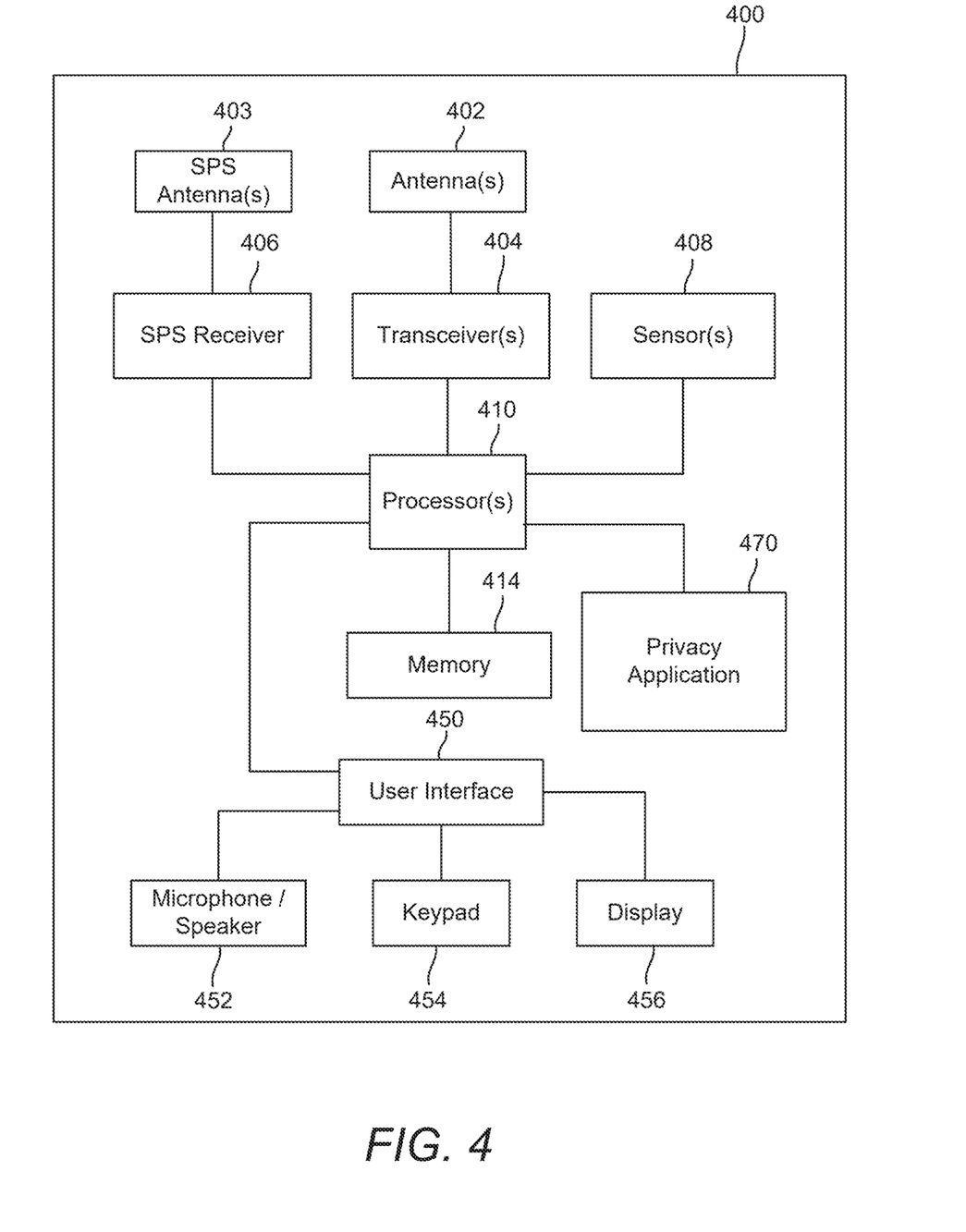
FIG. 4 is a block diagram illustrating various components of an example user device, according to aspects of the disclosure.

FIG. 4 is a block diagram illustrating various components of an example user device 400, according to aspects of the disclosure. In an aspect, the user device may correspond to any of the user devices described herein, such as user device 110 in FIG. 1. As a specific example, the user device 400 may be a smartphone, a tablet computer, a laptop computer, a desktop computer, or the like.

For the sake of simplicity, the various features and functions illustrated in the block diagram of FIG. 4 are connected together using a common data bus that is meant to represent that these various features and functions are operatively coupled together. Those skilled in the art will recognize that other connections, mechanisms, features, functions, or the like, may be provided and adapted as necessary to operatively couple and configure an actual user device. Further, it is also recognized that one or more of the features or functions illustrated in the example of FIG. 4 may be further subdivided, or two or more of the features or functions illustrated in FIG. 4 may be combined.

The user device 400 may include one or more transceivers 404 connected to one or more antennas 402 and providing means for communicating (e.g., means for transmitting, means for receiving, means for measuring, means for tuning, means for refraining from transmitting, etc.) with other network nodes, such as other user devices 110 and/or the privacy server(s) 120 via at least one designated radio access technology (RAT) (e.g., Wi-Fi, Long-Term Evolution (LTE), Fifth Generation New Radio (5G NR), etc.) over one or more wireless communication links. The one or more transceivers 404 may be variously configured for transmitting and encoding wireless signals (e.g., messages, indications, information, and so on), and, conversely, for receiving and decoding wireless signals (e.g., messages, indications, information, pilots, and so on) in accordance with the designated RAT. In an aspect, the one or more transceivers 404 and the antenna(s) 402 may form a (wireless) communication interface of the user device 400.

As used herein, a "transceiver" may include at least one transmitter and at least one receiver in an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antenna(s) 402), such as an antenna array. Similarly, a receiver may include or be coupled to a plurality of antennas (e.g., antenna(s) 402), such as an antenna array. In an aspect, the transmitter(s) and receiver(s) may share the same plurality of antennas (e.g., antenna(s) 402), such that the user device 400 can only receive or transmit at a given time, not both at the same time. In some cases, a transceiver may not provide both transmit and receive functionalities. For example, a low functionality receiver circuit may be employed in some designs to reduce costs when providing full communication is not necessary (e.g., a receiver chip or similar circuitry simply providing low-level sniffing).

The user device 400 may also include a satellite positioning system (SPS) receiver 406. The SPS receiver 406 may be connected to the one or more SPS antennas 403 and may provide means for receiving and/or measuring satellite signals. The SPS receiver 406 may comprise any suitable hardware and/or software for receiving and processing SPS signals, such as global positioning system (GPS) signals. The SPS receiver 406 requests information and operations as appropriate from the other systems, and performs the calculations necessary to determine the user device's 400 position using measurements obtained by any suitable SPS algorithm.

One or more sensors 408 may be coupled to one or more processors 410 and may provide means for sensing or detecting information related to the state and/or environment of the user device 400, such as speed, heading (e.g., compass heading), headlight status, gas mileage, etc. By way of example, the one or more sensors 408 may include a speedometer, a tachometer, an accelerometer (e.g., a microelectromechanical systems (MEMS) device), a gyroscope, a geomagnetic sensor (e.g., a compass), an altimeter (e.g., a barometric pressure altimeter), etc.

The one or more processors 410 may include one or more central processing units (CPUs), microprocessors, microcontrollers, ASICs, processing cores, digital signal processors (DSPs), field-programmable gate arrays (FPGAs), or the like that provide processing functions, as well as other calculation and control functionality. The one or more processors 410 may therefore provide means for processing, such as means for determining, means for calculating, means for receiving, means for transmitting, means for indicating, etc. The one or more processors 410 may include any form of logic suitable for performing, or causing the components of the user device 400 to perform, at least the techniques described herein.

The one or more processors 410 may also be coupled to a memory 414 providing means for storing (including means for retrieving, means for maintaining, etc.) data and software instructions for executing programmed functionality within the user device 400. The memory 414 may be on-board the one or more processors 410 (e.g., within the same integrated circuit (IC) package), and/or the memory 414 may be external to the one or more processors 410 and functionally coupled over a data bus.

The user device 400 may include a user interface 450 that provides any suitable interface systems, such as a microphone/speaker 452, keypad 454, and display 456 that allow user interaction with the user device 400. The microphone/speaker 452 may provide for voice communication services with the user device 400. The keypad 454 may comprise any suitable buttons for user input to the user device 400. The display 456 may comprise any suitable display, such as, for example, a backlit liquid crystal display (LCD), and may further include a touch screen display for additional user input modes. The user interface 450 may therefore be a means for providing indications (e.g., audible and/or visual indications) to a user and/or for receiving user input (e.g., via user actuation of a sensing device such a keypad, a touch screen, a microphone, and so on).

In an aspect, the user device 400 may include a privacy application 470 (which may correspond to privacy application 115) coupled to the one or more processors 410. The privacy application 470 may be a hardware, software, or firmware component that, when executed, causes the user device 400 to perform the operations described herein. For example, the privacy application 470 may be a software module stored in memory 414 and executable by the one or more processors 410. As another example, the privacy application 470 may be a hardware circuit (e.g., an ASIC, an FPGA, etc.) within the user device 400.

Figure 5:
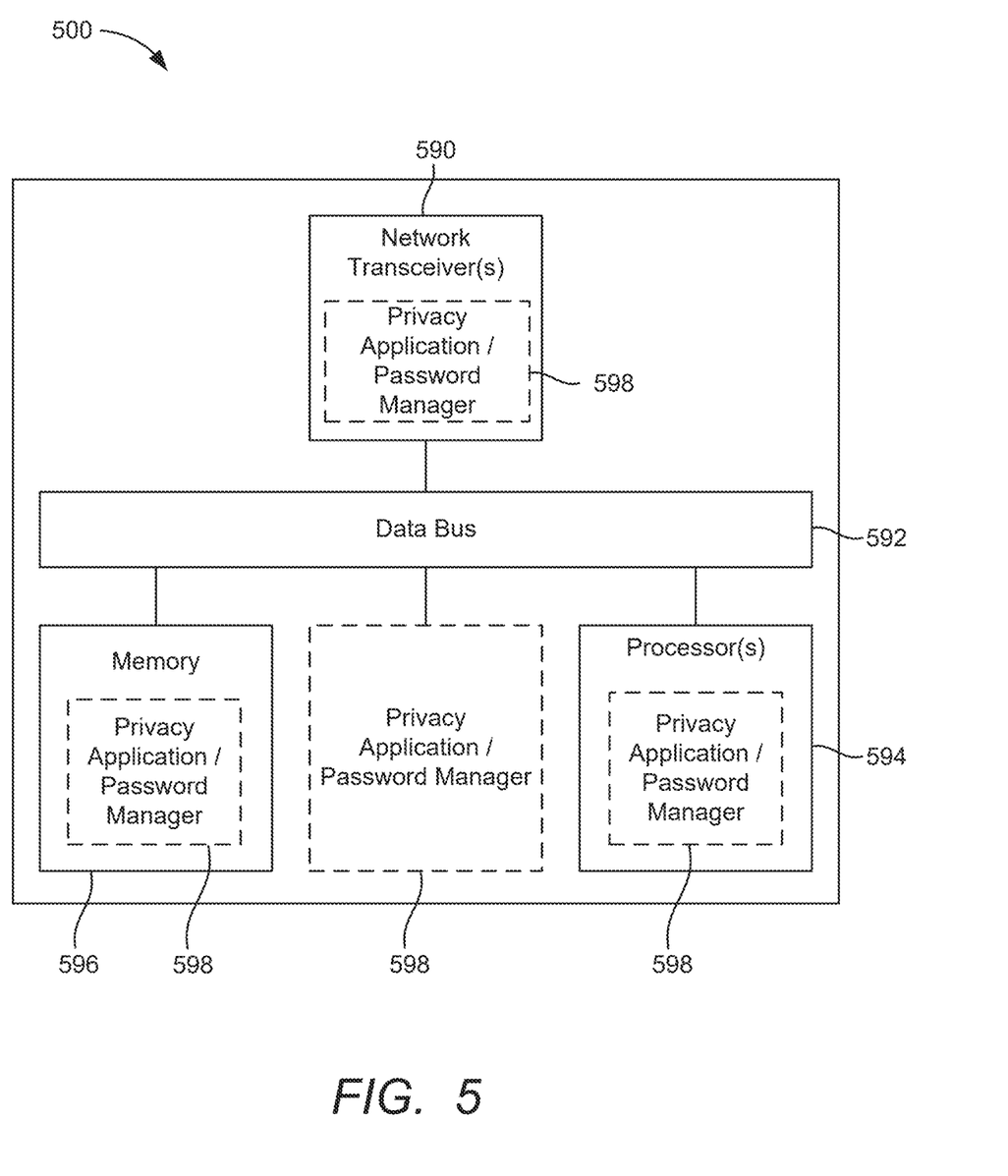
FIG. 5 is a block diagram illustrating various components of an example privacy server, according to aspects of the disclosure.

FIG. 5 illustrates several example components (represented by corresponding blocks) that may be incorporated into a privacy server 500 (which may correspond to a privacy server 120) to support the operations described herein.

The privacy server 500 may include one or more network transceivers 590 providing means for communicating (e.g., means for transmitting, means for receiving, etc.) with other network entities (e.g., other privacy servers 500/120). For example, the privacy server 500 may employ the one or more network transceivers 590 to communicate with other privacy servers 500/120 over one or more wired or wireless network interfaces.

The privacy server 500 may also include other components that may be used in conjunction with the operations as disclosed herein. The privacy server 500 may include one or more processors 594 for providing functionality relating to, for example, password manager procedures, as described herein, and for providing other processing functionality. The one or more processors 594 may therefore provide means for processing, such as means for determining, means for calculating, means for receiving, means for transmitting, means for indicating, etc. In an aspect, the one or more processors 594 may include, for example, one or more general purpose processors, multi-core processors, CPUs, ASICs, DSPs, FPGAs, other programmable logic devices or processing circuitry, or various combinations thereof.

The privacy server 500 may include memory circuitry implementing one or more memories 596 (e.g., each including a memory device) for maintaining information (e.g., the database of service providers 124, the notification system 126, and so on). The one or more memories 596 may therefore provide means for storing, means for retrieving, means for maintaining, etc. In some cases, the privacy server 500 may include a privacy application 598 (which may correspond to the privacy application 115 and/or the notification system 126, respectively). The privacy application 598 may be hardware circuits that are part of or coupled to the one or more processors 594 that, when executed, cause the privacy server 500 to perform the functionality described herein. In other aspects, the privacy application 598 may be external to the one or more processors 594 (e.g., part of a modem processing system, integrated with another processing system, etc.). Alternatively, the privacy application 598 may be a memory module stored in the one or more memories 596 that, when executed by the one or more processors 594 (or a modem processing system, another processing system, etc.), cause the privacy server 500 to perform the functionality described herein. FIG. 5 illustrates possible locations of the privacy application 598, which may be, for example, part of the one or more network transceivers 590, the one or more memories 596, the one or more processors 594, or any combination thereof, or may be a standalone component.

The various components of the privacy server 500 may be communicatively coupled to each other over a data bus 592. In an aspect, the data bus 592 may form, or be part of, a communication interface of the privacy server 500. For example, where different logical entities are embodied in the same device, the data bus 592 may provide communication between them.

The components of FIG. 5 may be implemented in various ways. In some cases, the components of FIG. 5 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 590 to 598 may be implemented by processor and memory component(s) of the privacy server 500 (e.g., by execution of appropriate code and/or by appropriate configuration of processor components). For simplicity, various operations, acts, and/or functions are described herein as being performed "by a privacy server." However, as will be appreciated, such operations, acts, and/or functions may actually be performed by specific components or combinations of components of the privacy server 500, such as the one or more processors 594, the one or more network transceivers 590, the one or more memories 596, the privacy application 598, etc.

Figure 6:
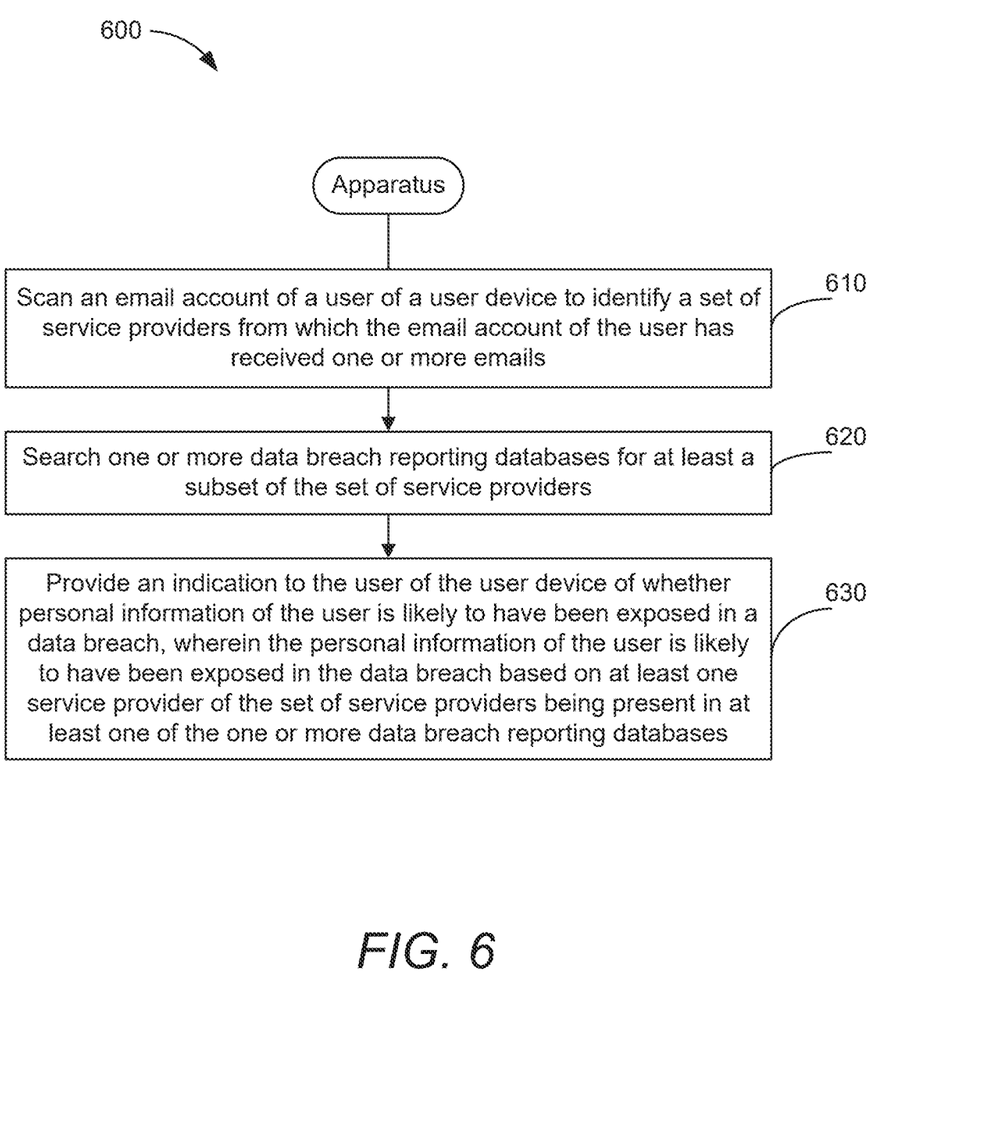
FIG. 6 illustrates an example method providing an early warning notification to a user if they were likely involved in a data breach, according to aspects of the disclosure.

FIG. 6 illustrates an example method 600 of providing an early warning notification to a user if they were likely involved in a data breach, according to aspects of the disclosure. In an aspect, method 600 may be performed by an apparatus (e.g., user device 400 or privacy server 500). In some cases, the apparatus may be a component of the user device 400 or the privacy server 500, such as a processing system (e.g., the one or more processors 410 of the user device 400 or the one or more processors 594 of the privacy server 500, optionally in combination with other components of the user device 400 or the privacy server 500).

At operation 610, the apparatus scans an email account of a user of a user device to identify a set of service providers from which the email account of the user has received one or more emails, as at stage 310 of FIG. 3.

In an aspect, where the apparatus is, or is a component of, a user device 400, operation 610 may be performed by the one or more transceivers 404, the one or more processors 410, memory 414, the user interface 450, and/or privacy application 470, any or all of which may be considered means for performing this operation.

In an aspect, where the apparatus is, or is a component of, a privacy server 500, operation 610 may be performed the one or more network transceivers 590, the one or more processors 594, memory 596, and/or privacy application 598, any or all of which may be considered means for performing this operation.

In some cases, the email account of the user is scanned in response to a request from the user or periodically.

In some cases, the set of service providers from which the email account of the user has received one or more emails includes all service providers identified in the email account of the user, or only service providers identified in the email account of the user and present in a database of service providers.

In some cases, the method 600 may further include (not shown) displaying, via a user interface of the user device, the set of service providers, and receiving, via the user interface of the user device, a selection of at least the subset of the set of service providers, where the selection of at least the subset of the set of service providers indicates that the user has an account with each of the subset of the set of service providers.

At operation 620, the apparatus searches one or more data breach reporting databases for at least a subset of the set of service providers, as at stage 320 of FIG. 3.

In an aspect, where the apparatus is, or is a component of, a user device 400, operation 620 may be performed by the one or more transceivers 404, the one or more processors 410, memory 414, the user interface 450, and/or privacy application 470, any or all of which may be considered means for performing this operation.

In an aspect, where the apparatus is, or is a component of, a privacy server 500, operation 620 may be performed the one or more network transceivers 590, the one or more processors 594, memory 596, and/or privacy application 598, any or all of which may be considered means for performing this operation.

In some cases, searching the one or more data breach reporting databases may include transmitting, via a communication interface of or coupled to the apparatus (e.g., transceiver(s) 404, network transceivers 590), one or more queries to the one or more data breach reporting databases, the one or more queries including at least the subset of the set of service providers, and receiving, via the communication interface, from the one or more data breach reporting databases, search results including at least the at least one service provider.

In some cases, searching the one or more data breach reporting databases for at least the subset of the set of service providers may include searching the one or more data breach reporting databases for the set of service providers.

At operation 630, the apparatus provides an indication to the user of the user device of whether personal information of the user is likely to have been exposed in a data breach, as at stage 340, where the personal information of the user is likely to have been exposed in the data breach based on at least one service provider of the set of service providers being present in at least one of the one or more data breach reporting databases.

In an aspect, where the apparatus is, or is a component of, a user device 400, operation 630 may be performed by the one or more transceivers 404, the one or more processors 410, memory 414, the user interface 450, and/or privacy application 470, any or all of which may be considered means for performing this operation.

In an aspect, where the apparatus is, or is a component of, a privacy server 500, operation 630 may be performed the one or more network transceivers 590, the one or more processors 594, memory 596, and/or privacy application 598, any or all of which may be considered means for performing this operation.

In some cases, providing the indication may include displaying the indication on a user interface of the user device, emailing the indication to an email address of the user, texting the indication to a phone number of the user, or any combination thereof.

In some cases, the indication may include a list of the at least one service provider, human-readable text indicating that the personal information of the user is likely to have been exposed in the data breach, information about at least one data breach involving the at least one service provider, or any combination thereof.

In some cases, the method 600 may further include (not shown) displaying a listing of the at least one service provider, and receiving, via a user interface of the user device (e.g., user interface 450), an indication of whether the user of the user device has an account with the at least one service provider.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method performed by an apparatus, comprising: scanning an email account of a user of a user device to identify a set of service providers from which the email account of the user has received one or more emails; searching one or more data breach reporting databases for at least a subset of the set of service providers; and providing an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

Clause 2. The method of clause 1, wherein providing the indication comprises: displaying the indication on a user interface of the user device, emailing the indication to an email address of the user, texting the indication to a phone number of the user, or any combination thereof.

Clause 3. The method of any of clauses 1 to 2, wherein the email account of the user is scanned: in response to a request from the user, or periodically.

Clause 4. The method of any of clauses 1 to 3, wherein searching the one or more data breach reporting databases comprises: transmitting, via a communication interface of or coupled to the apparatus, one or more queries to the one or more data breach reporting databases, the one or more queries including at least the subset of the set of service providers; and receiving, via the communication interface, from the one or more data breach reporting databases, search results including at least the at least one service provider.

Clause 5. The method of any of clauses 1 to 4, further comprising: displaying a listing of the at least one service provider; and receiving, via a user interface of the user device, an indication of whether the user of the user device has an account with the at least one service provider.

Clause 6. The method of any of clauses 1 to 5, wherein searching the one or more data breach reporting databases for at least the subset of the set of service providers comprises: searching the one or more data breach reporting databases for the set of service providers.

Clause 7. The method of any of clauses 1 to 6, further comprising: displaying, via a user interface of the user device, the set of service providers; and receiving, via the user interface of the user device, a selection of at least the subset of the set of service providers, wherein the selection of at least the subset of the set of service providers indicates that the user has an account with each of the subset of the set of service providers.

Clause 8. The method of any of clauses 1 to 7, wherein the set of service providers from which the email account of the user has received one or more emails includes: all service providers identified in the email account of the user, or only service providers identified in the email account of the user and present in a database of service providers.

Clause 9. The method of any of clauses 1 to 8, wherein the indication comprises: a list of the at least one service provider, human-readable text indicating that the personal information of the user is likely to have been exposed in the data breach, information about at least one data breach involving the at least one service provider, or any combination thereof.

Clause 10. The method of any of clauses 1 to 9, further comprising: connecting to one or more email servers hosting the email account of the user, wherein the email account of the user is scanned on the one or more email servers via a communication interface of or coupled to the apparatus.

Clause 11. The method of any of clauses 1 to 10, wherein the apparatus is, or is a component of: the user device, or a remote server.

Clause 12. An apparatus, comprising: one or more memories; one or more transceivers; and one or more processors communicatively coupled to the one or more memories and the one or more transceivers, the one or more processors, either alone or in combination, configured to: scan an email account of a user of a user device to identify a set of service providers from which the email account of the user has received one or more emails; search one or more data breach reporting databases for at least a subset of the set of service providers; and provide an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

Clause 13. The apparatus of clause 12, wherein the one or more processors configured to provide the indication comprises the one or more processors, either alone or in combination, configured to: display the indication on a user interface of the user device, email the indication to an email address of the user, text the indication to a phone number of the user, or any combination thereof.

Clause 14. The apparatus of any of clauses 12 to 13, wherein the email account of the user is scanned: in response to a request from the user, or periodically.

Clause 15. The apparatus of any of clauses 12 to 14, wherein the one or more processors configured to search the one or more data breach reporting databases comprises the one or more processors, either alone or in combination, configured to: transmit, via the one or more transceivers, one or more queries to the one or more data breach reporting databases, the one or more queries including at least the subset of the set of service providers; and receive, via the one or more transceivers, from the one or more data breach reporting databases, search results including at least the at least one service provider.

Clause 16. The apparatus of any of clauses 12 to 15, wherein the one or more processors, either alone or in combination, are further configured to: display a listing of the at least one service provider; and receive, via the one or more transceivers, an indication of whether the user of the user device has an account with the at least one service provider.

Clause 17. The apparatus of any of clauses 12 to 16, wherein the one or more processors configured to search the one or more data breach reporting databases for at least the subset of the set of service providers comprises the one or more processors, either alone or in combination, configured to: search the one or more data breach reporting databases for the set of service providers.

Clause 18. The apparatus of any of clauses 12 to 17, wherein the one or more processors, either alone or in combination, are further configured to: display, via a user interface of the user device, the set of service providers; and receive, via the one or more transceivers, a selection of at least the subset of the set of service providers, wherein the selection of at least the subset of the set of service providers indicates that the user has an account with each of the subset of the set of service providers.

Clause 19. The apparatus of any of clauses 12 to 18, wherein the set of service providers from which the email account of the user has received one or more emails includes: all service providers identified in the email account of the user, or only service providers identified in the email account of the user and present in a database of service providers.

Clause 20. The apparatus of any of clauses 12 to 19, wherein the indication comprises: a list of the at least one service provider, human-readable text indicating that the personal information of the user is likely to have been exposed in the data breach, information about at least one data breach involving the at least one service provider, or any combination thereof.

Clause 21. The apparatus of any of clauses 12 to 20, wherein the one or more processors, either alone or in combination, are further configured to: connect, via the one or more transceivers, to one or more email servers hosting the email account of the user, wherein the email account of the user is scanned on the one or more email servers via the one or more transceivers.

Clause 22. The apparatus of any of clauses 12 to 21, wherein the apparatus is, or is a component of: the user device, or a remote server.

Clause 23. An apparatus, comprising: means for scanning an email account of a user of a user device to identify a set of service providers from which the email account of the user has received one or more emails; means for searching one or more data breach reporting databases for at least a subset of the set of service providers; and means for providing an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

Clause 24. The apparatus of clause 23, wherein the means for providing the indication comprises: means for displaying the indication on a user interface of the user device, means for emailing the indication to an email address of the user, means for texting the indication to a phone number of the user, or any combination thereof.

Clause 25. The apparatus of any of clauses 23 to 24, wherein the email account of the user is scanned: in response to a request from the user, or periodically.

Clause 26. The apparatus of any of clauses 23 to 25, wherein the means for searching the one or more data breach reporting databases comprises: means for transmitting, via a communication interface of or coupled to the apparatus, one or more queries to the one or more data breach reporting databases, the one or more queries including at least the subset of the set of service providers; and means for receiving, via the communication interface, from the one or more data breach reporting databases, search results including at least the at least one service provider.

Clause 27. The apparatus of any of clauses 23 to 26, further comprising: means for displaying a listing of the at least one service provider; and means for receiving, via a user interface of the user device, an indication of whether the user of the user device has an account with the at least one service provider.

Clause 28. The apparatus of any of clauses 23 to 27, wherein the means for searching the one or more data breach reporting databases for at least the subset of the set of service providers comprises: means for searching the one or more data breach reporting databases for the set of service providers.

Clause 29. The apparatus of any of clauses 23 to 28, further comprising: means for displaying, via a user interface of the user device, the set of service providers; and means for receiving, via the user interface of the user device, a selection of at least the subset of the set of service providers, wherein the selection of at least the subset of the set of service providers indicates that the user has an account with each of the subset of the set of service providers.

Clause 30. The apparatus of any of clauses 23 to 29, wherein the set of service providers from which the email account of the user has received one or more emails includes: all service providers identified in the email account of the user, or only service providers identified in the email account of the user and present in a database of service providers.

Clause 31. The apparatus of any of clauses 23 to 30, wherein the indication comprises: a list of the at least one service provider, human-readable text indicating that the personal information of the user is likely to have been exposed in the data breach, information about at least one data breach involving the at least one service provider, or any combination thereof.

Clause 32. The apparatus of any of clauses 23 to 31, further comprising: means for connecting to one or more email servers hosting the email account of the user, wherein the email account of the user is scanned on the one or more email servers via a communication interface of or coupled to the apparatus.

Clause 33. The apparatus of any of clauses 23 to 32, wherein the apparatus is, or is a component of: the user device, or a remote server.

Clause 34. A non-transitory computer-readable medium storing computer-executable instructions that, when executed by an apparatus, cause the apparatus to: scan an email account of a user of a user device to identify a set of service providers from which the email account of the user has received one or more emails; search one or more data breach reporting databases for at least a subset of the set of service providers; and provide an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

Clause 35. The non-transitory computer-readable medium of clause 34, wherein the computer-executable instructions that, when executed by the apparatus, cause the apparatus to provide the indication comprise computer-executable instructions that, when executed by the apparatus, cause the apparatus to: display the indication on a user interface of the user device, email the indication to an email address of the user, text the indication to a phone number of the user, or any combination thereof.

Clause 36. The non-transitory computer-readable medium of any of clauses 34 to 35, wherein the email account of the user is scanned: in response to a request from the user, or periodically.

Clause 37. The non-transitory computer-readable medium of any of clauses 34 to 36, wherein the computer-executable instructions that, when executed by the apparatus, cause the apparatus to search the one or more data breach reporting databases comprise computer-executable instructions that, when executed by the apparatus, cause the apparatus to: transmit, via a communication interface of or coupled to the apparatus, one or more queries to the one or more data breach reporting databases, the one or more queries including at least the subset of the set of service providers; and receive, via the communication interface, from the one or more data breach reporting databases, search results including at least the at least one service provider.

Clause 38. The non-transitory computer-readable medium of any of clauses 34 to 37, further comprising computer-executable instructions that, when executed by the apparatus, cause the apparatus to: display a listing of the at least one service provider; and receive, via a user interface of the user device, an indication of whether the user of the user device has an account with the at least one service provider.

Clause 39. The non-transitory computer-readable medium of any of clauses 34 to 38, wherein the computer-executable instructions that, when executed by the apparatus, cause the apparatus to search the one or more data breach reporting databases for at least the subset of the set of service providers comprise computer-executable instructions that, when executed by the apparatus, cause the apparatus to: search the one or more data breach reporting databases for the set of service providers.

Clause 40. The non-transitory computer-readable medium of any of clauses 34 to 39, further comprising computer-executable instructions that, when executed by the apparatus, cause the apparatus to: display, via a user interface of the user device, the set of service providers; and receive, via the user interface of the user device, a selection of at least the subset of the set of service providers, wherein the selection of at least the subset of the set of service providers indicates that the user has an account with each of the subset of the set of service providers.

Clause 41. The non-transitory computer-readable medium of any of clauses 34 to 40, wherein the set of service providers from which the email account of the user has received one or more emails includes: all service providers identified in the email account of the user, or only service providers identified in the email account of the user and present in a database of service providers.

Clause 42. The non-transitory computer-readable medium of any of clauses 34 to 41, wherein the indication comprises: a list of the at least one service provider, human-readable text indicating that the personal information of the user is likely to have been exposed in the data breach, information about at least one data breach involving the at least one service provider, or any combination thereof.

Clause 43. The non-transitory computer-readable medium of any of clauses 34 to 42, further comprising computer-executable instructions that, when executed by the apparatus, cause the apparatus to: connect to one or more email servers hosting the email account of the user, wherein the email account of the user is scanned on the one or more email servers via a communication interface of or coupled to the apparatus.

Clause 44. The non-transitory computer-readable medium of any of clauses 34 to 43, wherein the apparatus is, or is a component of: the user device, or a remote server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., a user equipment (UE)). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method performed by an apparatus, comprising:
    scanning an email account of a user of a user device to identify a set of service providers from which the email account of the user has received one or more emails;
    displaying, via a user interface of the user device, the set of service providers;
    receiving, via the user interface of the user device, a selection of at least a subset of the set of service providers, wherein the selection of at least the subset of the set of service providers indicates that the user has an account with each of the subset of the set of service providers,
    searching one or more data breach reporting databases for at least the subset of the set of service providers; and
    providing an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

2. The method of claim 1, wherein providing the indication comprises:
    displaying the indication on a user interface of the user device,
    emailing the indication to an email address of the user,
    texting the indication to a phone number of the user, or
    any combination thereof.

3. The method of claim 1, wherein the email account of the user is scanned:
    in response to a request from the user, or
    periodically.

4. The method of claim 1, wherein searching the one or more data breach reporting databases comprises:
    transmitting, via a communication interface of or coupled to the apparatus, one or more queries to the one or more data breach reporting databases, the one or more queries including at least the subset of the set of service providers; and
    receiving, via the communication interface, from the one or more data breach reporting databases, search results including at least the at least one service provider.

5. The method of claim 1, further comprising:
    displaying a listing of the at least one service provider; and
    receiving, via a user interface of the user device, an indication of whether the user of the user device has an account with the at least one service provider.

6. The method of claim 1, wherein the indication comprises:
    a list of the at least one service provider,
    human-readable text indicating that the personal information of the user is likely to have been exposed in the data breach,
    information about at least one data breach involving the at least one service provider, or
    any combination thereof.

7. The method of claim 1, further comprising:
    connecting to one or more email servers hosting the email account of the user, wherein the email account of the user is scanned on the one or more email servers via a communication interface of or coupled to the apparatus.

8. An apparatus, comprising:
one or more memories;
one or more transceivers; and
one or more processors communicatively coupled to the one or more memories and the one or more transceivers, the one or more processors, either alone or in combination, configured to:
  scan an email account of a user of a user device to identify a set of service providers from which the email account of the user has received one or more emails;
  display, via a user interface of the user device, the set of service providers;
  receive, via the user interface of the user device, a selection of at least a subset of the set of service providers, wherein the selection of at least the subset of the set of service providers indicates that the user has an account with each of the subset of the set of service providers,
  search one or more data breach reporting databases for at least the subset of the set of service providers; and
  provide an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

9. The apparatus of claim 8, wherein the one or more processors configured to provide the indication comprises the one or more processors, either alone or in combination, configured to:
  display the indication on a user interface of the user device,
  email the indication to an email address of the user,
  text the indication to a phone number of the user, or
  any combination thereof.

10. The apparatus of claim 8, wherein the email account of the user is scanned:
  in response to a request from the user, or
  periodically.

11. The apparatus of claim 8, wherein the one or more processors configured to search the one or more data breach reporting databases comprises the one or more processors, either alone or in combination, configured to:
  transmit, via the one or more transceivers, one or more queries to the one or more data breach reporting databases, the one or more queries including at least the subset of the set of service providers; and
  receive, via the one or more transceivers, from the one or more data breach reporting databases, search results including at least the at least one service provider.

12. The apparatus of claim 8, wherein the one or more processors, either alone or in combination, are further configured to:
  display a listing of the at least one service provider; and
  receive, via the one or more transceivers, an indication of whether the user of the user device has an account with the at least one service provider.

13. The apparatus of claim 8, wherein the one or more processors configured to search the one or more data breach reporting databases for at least the subset of the set of service providers comprises the one or more processors, either alone or in combination, configured to:
  search the one or more data breach reporting databases for the set of service providers.

14. The apparatus of claim 8, wherein the set of service providers from which the email account of the user has received one or more emails includes:
  all service providers identified in the email account of the user, or
  only service providers identified in the email account of the user and present in a database of service providers.

15. The apparatus of claim 8, wherein the indication comprises:
  a list of the at least one service provider,
  human-readable text indicating that the personal information of the user is likely to have been exposed in the data breach,
  information about at least one data breach involving the at least one service provider, or
  any combination thereof.

16. The apparatus of claim 8, wherein the one or more processors, either alone or in combination, are further configured to:
  connect, via the one or more transceivers, to one or more email servers hosting the email account of the user, wherein the email account of the user is scanned on the one or more email servers via the one or more transceivers.

17. The apparatus of claim 8, wherein the apparatus is, or is a component of:
  the user device, or
  a remote server.

18. An apparatus, comprising:
  means for scanning an email account of a user of a user device to identify a set of service providers from which the email account of the user has received one or more emails;
  means for displaying the set of service providers;
  means for receiving a selection of at least a subset of the set of service providers, wherein the selection of at least the subset of the set of service providers indicates that the user has an account with each of the subset of the set of service providers,
  means for searching one or more data breach reporting databases for at least the subset of the set of service providers; and
  means for providing an indication to the user of the user device of whether personal information of the user is likely to have been exposed in a data breach, wherein the personal information of the user is likely to have been exposed in the data breach based on at least one service provider of the set of service providers being present in at least one of the one or more data breach reporting databases.

* * * * *